（12） United States Patent
Borse et al.

(10) Patent No.: US 12,236,349 B2
(45) Date of Patent: Feb. 25, 2025

(54) GUIDED TRAINING OF MACHINE LEARNING MODELS WITH CONVOLUTION LAYER FEATURE DATA FUSION

(71) Applicant: QUALCOMM Incorporated, San Diego, CA (US)

(72) Inventors: Shubhankar Mange Borse, San Diego, CA (US); Nojun Kwak, San Diego, CA (US); Daniel Hendricus Franciscus Dijkman, Haarlem (NL); Bence Major, Amsterdam (NL)

(73) Assignee: QUALCOMM Incorporated, San Diego, CA (US)

( * ) Notice: Subject to any disclaimer, the term of this patent is extended or adjusted under 35 U.S.C. 154(b) by 997 days.

(21) Appl. No.: 17/098,159

(22) Filed: Nov. 13, 2020

(65) Prior Publication Data

US 2021/0150347 A1 May 20, 2021

Related U.S. Application Data

(60) Provisional application No. 62/935,428, filed on Nov. 14, 2019.

(51) Int. Cl.
*G06N 3/084* (2023.01)
*G06F 18/2137* (2023.01)
(Continued)

(52) U.S. Cl.
CPC ......... *G06N 3/084* (2013.01); *G06F 18/2137* (2023.01); *G06F 18/251* (2023.01);
(Continued)

(58) Field of Classification Search
None
See application file for complete search history.

(56) References Cited

U.S. PATENT DOCUMENTS

2017/0140253 A1* 5/2017 Wshah ............... G06V 20/54
2018/0330194 A1* 11/2018 Peng ................ G06V 10/454
2019/0180136 A1* 6/2019 Bousmalis ........... G06V 10/72

FOREIGN PATENT DOCUMENTS

| CN | 109284733 A | 1/2019 |
| CN | 110309861 A | 10/2019 |
| WO | 2018120942 A1 | 7/2018 |

OTHER PUBLICATIONS

Guo, Liang, Yaguo Lei, Saibo Xing, Tao Yan, and Naipeng Li. "Deep convolutional transfer learning network: A new method for intelligent fault diagnosis of machines with unlabeled data." IEEE Transactions on Industrial Electronics 66, No. 9 (2018): 7316-7325. (Year: 2018).*

(Continued)

*Primary Examiner* — Vincent Gonzales
(74) *Attorney, Agent, or Firm* — Patterson & Sheridan LLP

(57) ABSTRACT

Aspects described herein provide a method of performing guided training of a neural network model, including: receiving supplementary domain feature data; providing the supplementary domain feature data to a fully connected layer of a neural network model; receiving from the fully connected layer supplementary domain feature scaling data; providing the supplementary domain feature scaling data to an activation function; receiving from the activation function supplementary domain feature weight data; receiving a set of feature maps from a first convolution layer of the neural network model; fusing the supplementary domain feature weight data with the set of feature maps to form fused feature maps; and providing the fused feature maps to a second convolution layer of the neural network model.

26 Claims, 9 Drawing Sheets

(51) Int. Cl.
  *G06F 18/25* (2023.01)
  *G06N 3/048* (2023.01)
  *G06N 3/063* (2023.01)
  *G06N 3/08* (2023.01)
  *G06V 10/764* (2022.01)
  *G06V 10/82* (2022.01)

(52) U.S. Cl.
  CPC .............. *G06N 3/048* (2023.01); *G06N 3/063* (2013.01); *G06N 3/08* (2013.01); *G06V 10/764* (2022.01); *G06V 10/82* (2022.01)

(56) References Cited

OTHER PUBLICATIONS

Oquab, Maxime, Leon Bottou, Ivan Laptev, and Josef Sivic. "Learning and transferring mid-level image representations using convolutional neural networks." In Proceedings of the IEEE conference on computer vision and pattern recognition, pp. 1717-1724. 2014. (Year: 2014).*

Akilian (Akilan, T., QM Jonathan Wu, Amin Safaei, and Wei Jiang. "A late fusion approach for harnessing multi-CNN model high-level features." In 2017 IEEE International Conference on Systems, Man, and Cybernetics (SMC), pp. 566-571. IEEE, 2017.) (Year: 2017).*

Salimans, Tim, and Durk P. Kingma. "Weight normalization: A simple reparameterization to accelerate training of deep neural networks." Advances in neural information processing systems 29 (2016). (Year: 2016).*

Hou C., et al., "End-to-End Bloody Video Recognition by Audio-Visual Feature Fusion", Nov. 2, 2018 (Nov. 2, 2018), Advances in Databases and Information Systems; [Lecture Notes in Computer Science; Lect.Notes Computer], Springer International Publishing, Cham, pp. 501-510, XP047493295, ISBN: 978-3-319-10403-4 [retrieved on Nov. 2, 2018] abstract; figure 1 paragraphs [0002], [0003].

International Search Report and Written Opinion—PCT/US2020/060769—ISA/EPO—Feb. 25, 2021.

* cited by examiner

GUIDED TRAINING OF MACHINE LEARNING MODELS WITH CONVOLUTION LAYER FEATURE DATA FUSION

CROSS-REFERENCE TO RELATED CASES

This Application claims the benefit of and priority to U.S. Provisional Patent Application No. 62/935,428, filed on Nov. 14, 2019, the entire contents of which are incorporated herein by reference.

INTRODUCTION

Aspects of the present disclosure relate to machine learning models, and in particular to guided training of deep neural network models using convolution layer feature data fusion.

Machine learning may produce a trained model (e.g., an artificial neural network, a tree, or other structures), which represents a generalizable fit to a set of training data that is known a priori. Applying the trained model to new data produces inferences, which may be used to gain insights into the new data. In some cases, applying the model to the new data is described as "running an inference" on the new data.

In some cases, it may be desirable to train a machine learning model, such as a deep neural network, based on multiple domains. For example, a first feature domain may relate to features learned from the training data, and a second feature domain may relate to features generated (e.g., by a subject matter expert) from the training data. Use of the additional domain of training data may be referred to as "guided training" of the machine learning model.

Conventionally, guided training of machine learning models, such as deep neural network models, has resulted in disadvantageous issues with the resultant models. For example, often the guided training results in a second feature domain becoming a dominant driver of the model output, which undermines the overarching goal of improving the model based on the multiple domains of feature data.

Accordingly, what are needed are improved machine learning methods for performing guided training of machine learning models, such as deep neural network models.

BRIEF SUMMARY

In a first aspect, a method of performing guided training of a neural network model includes: receiving supplementary domain feature data; providing the supplementary domain feature data to a fully connected layer of a neural network model; receiving from the fully connected layer supplementary domain feature scaling data; providing the supplementary domain feature scaling data to an activation function; receiving from the activation function supplementary domain feature weight data; receiving a set of feature maps from a first convolution layer of the neural network model; fusing the supplementary domain feature weight data with the set of feature maps to form fused feature maps; and providing the fused feature maps to a second convolution layer of the neural network model.

In a second aspect, a processing system configured to performing guided training of a neural network model includes: a memory comprising computer-executable instructions; one or more processors configured to execute the computer-executable instructions and cause the processing system to: receive supplementary domain feature data; provide the supplementary domain feature data to a fully connected layer of a neural network model; receive from the fully connected layer supplementary domain feature scaling data; provide the supplementary domain feature scaling data to an activation function; receive from the activation function supplementary domain feature weight data; receive a set of feature maps from a first convolution layer of the neural network model; fuse the supplementary domain feature weight data with the set of feature maps to form fused feature maps; and provide the fused feature maps to a second convolution layer of the neural network model.

In a third aspect, a non-transitory computer-readable medium includes instructions that, when executed by one or more processors of a processing system, cause the processing system to perform a method of performing guided training of a neural network model, the method including receiving supplementary domain feature data; providing the supplementary domain feature data to a fully connected layer of a neural network model; receiving from the fully connected layer supplementary domain feature scaling data; providing the supplementary domain feature scaling data to an activation function; receiving from the activation function supplementary domain feature weight data; receiving a set of feature maps from a first convolution layer of the neural network model; fusing the supplementary domain feature weight data with the set of feature maps to form fused feature maps; and providing the fused feature maps to a second convolution layer of the neural network model.

In a fourth aspect, a processing system configured to perform guided training of a neural network model includes: means for receiving supplementary domain feature data; means for providing the supplementary domain feature data to a fully connected layer of a neural network model; means for receiving from the fully connected layer supplementary domain feature scaling data; means for providing the supplementary domain feature scaling data to an activation function; means for receiving from the activation function supplementary domain feature weight data; means for receiving a set of feature maps from a first convolution layer of the neural network model; means for fusing the supplementary domain feature weight data with the set of feature maps to form fused feature maps; and means for providing the fused feature maps to a second convolution layer of the neural network model.

Further aspects relate to apparatuses configured to perform the methods described herein as well as non-transitory computer-readable mediums comprising computer-executable instructions that, when executed by a processor of a device, cause the device to perform the methods described herein.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1A:
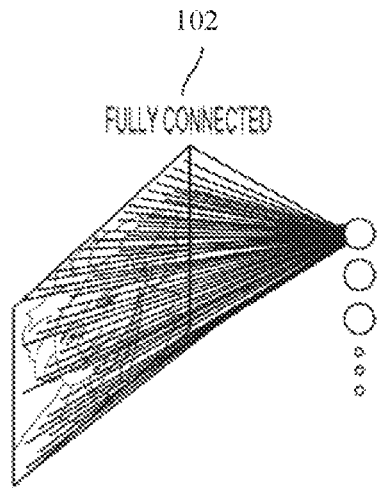
FIGS. 1A-1D depict example aspects of neural networks.

Aspects of the present disclosure provide apparatuses, methods, processing systems, and computer-readable mediums for performing guided training of machine learning models using convolution layer feature data fusion.

Brief Background on Neural Networks, Deep Neural Networks, and Deep Learning Neural networks are organized into layers of interconnected nodes. Generally, a node (or neuron) is where computation happens. For example, a node may combine input data with a set of weights (or coefficients) that either amplifies or dampens the input data. The amplification or dampening of the input signals may thus be considered an assignment of relative significances to various inputs with regard to a task the network is trying to learn. Generally, input-weight products are summed (or accumulated) and then the sum is passed through a node's activation function to determine whether and to what extent that signal should progress further through the network.

In a most basic implementation, a neural network may have an input layer, a hidden layer, and an output layer. "Deep" neural networks generally have more than one hidden layer.

Deep learning is a method of training deep neural networks. Generally, deep learning maps inputs to the network to outputs from the network and is thus sometimes referred to as a "universal approximator" because it can learn to approximate an unknown function $f(x)=y$ between any input x and any output y. In other words, deep learning finds the right $f$ to transform x into y.

More particularly, deep learning trains each layer of nodes based on a distinct set of features, which is the output from the previous layer. Thus, with each successive layer of a deep neural network, features become more complex. Deep learning is thus powerful because it can progressively extract higher level features from input data and perform complex tasks, such as object recognition, by learning to represent inputs at successively higher levels of abstraction in each layer, thereby building up a useful feature representation of the input data.

For example, if presented with visual data, a first layer of a deep neural network may learn to recognize relatively simple features, such as edges, in the input data. In another example, if presented with audio data, the first layer of a deep neural network may learn to recognize spectral powers in specific frequencies in the input data. The second layer of the deep neural network may then learn to recognize combinations of features, such as simple shapes for visual data or combinations of sounds for audio data, based on the output of the first layer. Higher layers may then learn to recognize complex shapes in visual data or words in audio data. Still higher layers may learn to recognize common visual objects or spoken phrases. Thus, deep learning architectures may perform especially well when applied to problems that have a natural hierarchical structure.

Layer Connectivity in Neural Networks

Neural networks, such as deep neural networks, may be designed with a variety of connectivity patterns between layers.

FIG. 1A illustrates an example of a fully connected neural network 102. In a fully connected neural network 102, each node in a first layer communicates its output to every node in a second layer, so that each node in the second layer will receive input from every node in the first layer. Further, each set of nodes in the second layer in a fully connected network is obtained by multiplying the set of nodes in the previous layer with a matrix kernel. The contents of the matrix kernel are weights, which are learnt during neural network training.

Figure 1B:
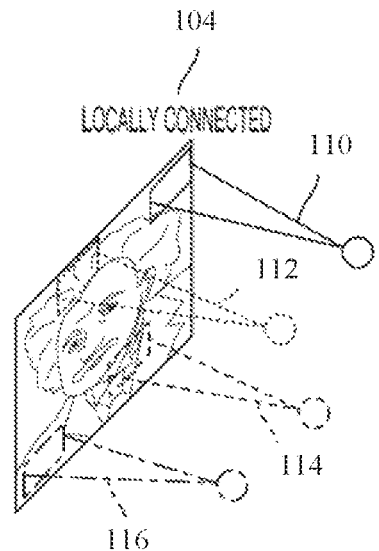

FIG. 1B illustrates an example of a locally connected neural network 104. In a locally connected neural network 104, a node in a first layer may be connected to a limited number of nodes in the second layer. More generally, a locally connected layer of the locally connected neural network 104 may be configured so that each node in a layer will have the same or a similar connectivity pattern, but with connections strengths (or weights) that may have different values (e.g., 110, 112, 114, and 116). The locally connected connectivity pattern may give rise to spatially distinct receptive fields in a higher layer, because the higher layer nodes in a given region may receive inputs that are tuned through training to the properties of a restricted portion of the total input to the network.

Figure 1C:
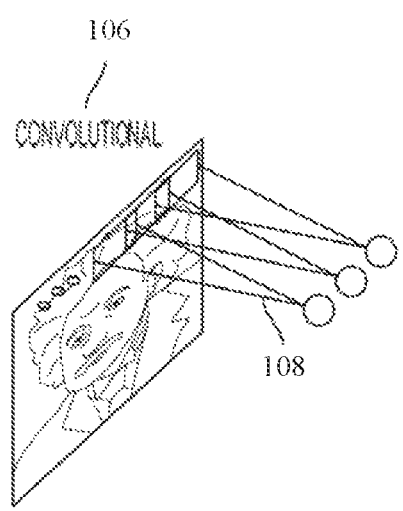

One type of locally connected neural network is a convolutional neural network. FIG. 1C illustrates an example of a convolutional neural network 106. Convolutional neural network 106 may be configured such that the connection strengths associated with the inputs for each node in the second layer are shared (e.g., 108). Convolutional neural networks are well-suited to problems in which the spatial location of inputs is meaningful.

One type of convolutional neural network is a deep convolutional network (DCN). Deep convolutional networks are networks of multiple convolutional layers, which may further be configured with, for example, pooling and normalization layers.

Figure 1D:
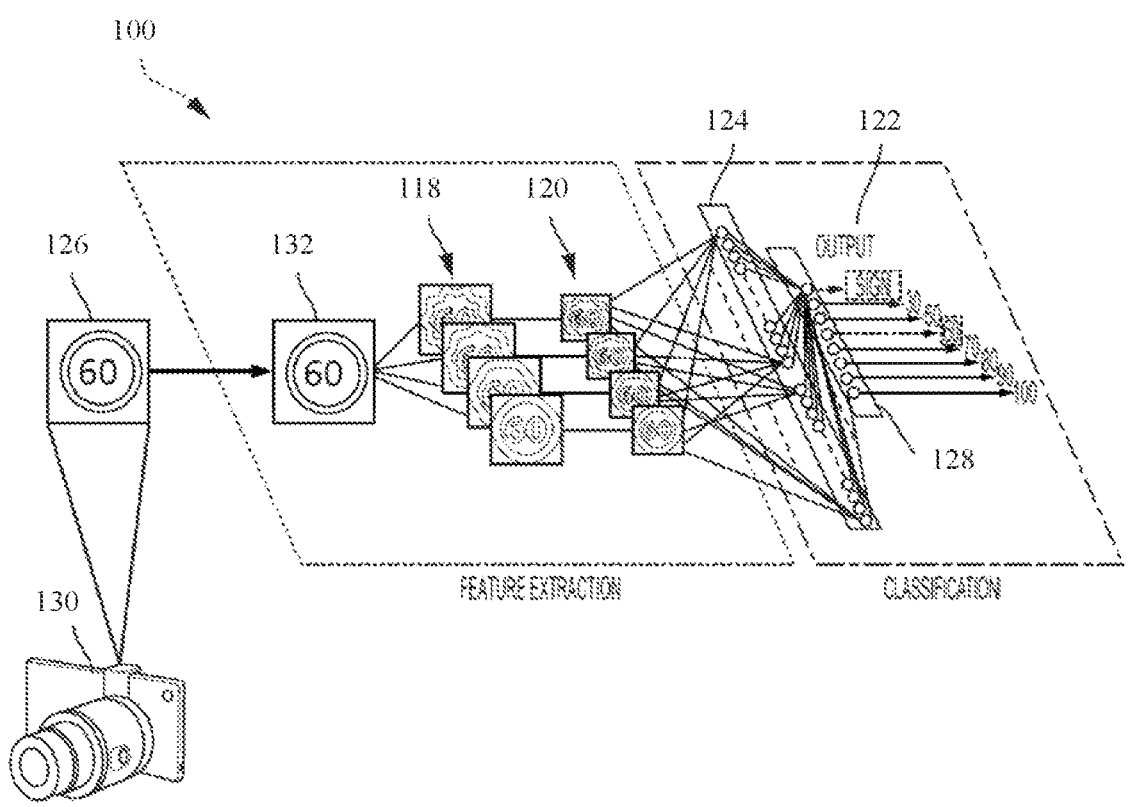

FIG. 1D illustrates an example of a DCN 100 designed to recognize visual features in an image 126 generated by an image capturing device 130. For example, if the image capturing device 130 was a camera mounted in a vehicle, then DCN 100 may be trained with various supervised learning techniques to identify a traffic sign and even a number on the traffic sign. DCN 100 may likewise be trained for other tasks, such as identifying lane markings or identifying traffic lights. These are just some example tasks, and many others are possible.

In this example, DCN 100 includes a feature extraction section and a classification section. Upon receiving the image 126, a convolutional layer 132 applies convolutional kernels to the image 126 to generate a first set of feature maps (which may be represented as tensors) 118. Generally, a kernel or filter comprises a multi-dimensional array of weights capable of emphasizing different aspects of an input data channel. Three-dimensional filters are frequently used in DCNs. In the present example, because four different convolutional kernels are applied to the image 126 at the convolutional layer 132, four different feature maps are generated in the first set of feature maps 118.

The first set of feature maps 118 may then be subsampled by a pooling layer (e.g., a max pooling layer, not shown) to generate a second set of feature maps 120. The pooling layer may reduce the size of the first set of feature maps 118 while maintain much of the information in order to improve model performance. For example, the second set of feature maps 120 may be down-sampled from 28×28 to 14×14 by the pooling layer.

This process may be repeated through many layers. In other words, the second set of feature maps 120 may be further convolved via one or more subsequent convolutional layers (not shown) to generate one or more subsequent sets of feature maps (not shown).

In the example of FIG. 1D, the second set of feature maps 120 is reshaped to generate a first set of nodes 124 (e.g., in a fully connected layer). Furthermore, the first set of nodes 124 is further connected to a second set of nodes 128 (e.g., another fully connected layer), which in this example are output nodes. Each node in the second set of nodes 128 may correspond to a possible feature of the image 126, such as "sign," "60," and "100."

A softmax function (not shown) may convert the values at the output nodes 128 into a probability in order that an output 122 of DCN 100 includes one or more probabilities of the image 126 including one or more features, such as a sign with the numbers "60" on it, as in input image 126. Thus, in the present example, the probabilities in the output 122 for "sign" and "60" should be higher than the probabilities of the others of the output 122, such as "30," "40," "50," "70," "80," "90," and "100".

Before training DCN 100, the output 122 produced by DCN 100 may be incorrect. Thus, an error may be calculated between the output 122 and a target output known a priori (e.g., labeled data). For example, here the target output is an indication that image 126 includes a "sign" and the number "60". Utilizing the known, target output, the weights of DCN 100 may then be adjusted through training so that subsequent output 122 of DCN 100 achieves the target output.

To adjust the weights of DCN 100, a learning algorithm may compute a gradient vector for the weights. The gradient may indicate an amount that an error would increase or decrease if a weight were adjusted in a particular way. The weights may then be adjusted to reduce the error. This manner of adjusting the weights may be referred to as "back propagation" as it involves a "backward pass" through the layers of DCN 100.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level.

After training, DCN 100 may be presented with new images and DCN 100 may generate inferences, such as classifications, or probabilities of various features being in the new image.

Figure 2:
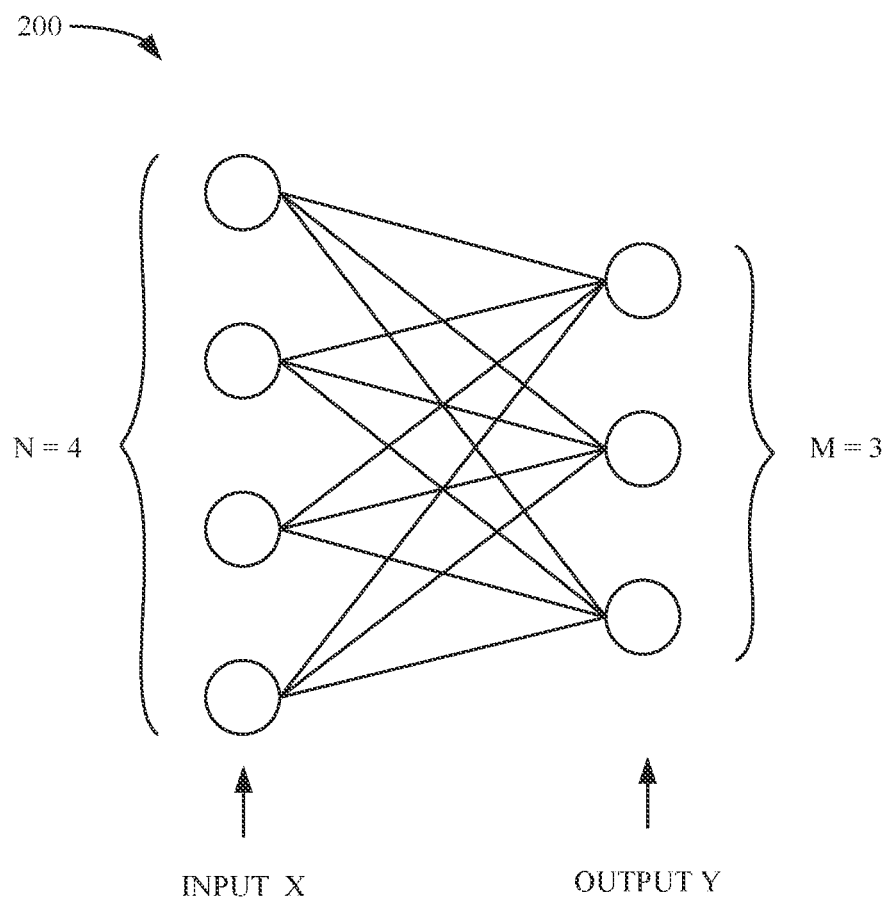
FIG. 2 depicts an example fully connected network.

FIG. 2 depicts an example of a fully connected network 200 with N=4 inputs (e.g., channels) and M=3 outputs (e.g., channels). As demonstrated in this example, a fully connected layer may change the size between an input X (e.g., a tensor) and output Y (e.g., another tensor).

Convolution Techniques for Convolutional Neural Networks

Convolution is generally used to extract useful features from an input data set. For example, in convolutional neural networks, such as described above, convolution enables the extraction of different features using kernels or filters whose weights are learned during training. The extracted features are then combined to make inferences.

One way to reduce the computational burden (e.g., measured in floating point operations per second (FLOPs)) and the number parameters associated with a convolutional neural network is to factorize the convolutional layers. For example, a spatial separable convolution may be factorized into two components: (1) a depthwise separable convolution, wherein each spatial channel is convolved independently by a depthwise convolution (e.g., a spatial fusion); and (2) a pointwise convolution, wherein all the spatial channels are linearly combined (e.g., a channel fusion). Generally, during spatial fusion, a network learns features from the spatial planes and during channel fusion the network learns relations between these features across channels.

In one example, a separable depthwise convolutions may be implemented using 3×3 kernels for spatial fusion, and 1×1 kernels for channel fusion. In particular, the channel fusion may use a 1×1×d kernel that iterates through every single point in an input image of depth d, wherein the depth d of the kernel generally matches the number of channels of the input image. Channel fusion via pointwise convolution is useful for dimensionality reduction for efficient computations.

An activation function may be applied before and/or after each layer of a convolutional neural network. Activation functions are generally mathematical functions (e.g., equations) that determine the output of a node of a neural network. Thus, the activation function determines whether a node should pass information or not, based on whether the node's input is relevant to the model's prediction. In one example, where y=Conv(x) (i.e., y=a convolution of x), both x and y may be generally considered as "activations". However, in terms of a particular convolution operation, x may also be referred to as a "pre-activation" or "input activation" as it exists before the particular convolution, and y may be referred to as an output activation.

Neural network models often use non-linear activation functions, which allow the creation of complex mappings between inputs and outputs and thus allow for learning and modeling complex data, such as images, video, audio, and data sets which are non-linear and/or have high dimensionality. Non-linear activation functions include, for example, sigmoid or logistic functions, hyperbolic tangent (tanh) functions, rectified linear unit (ReLU), leaky ReLU, parametric ReLU, concatenated ReLU, softmax, and Swish, to name a few examples.

Non-linear activations functions are beneficial because they allow back propagation (during training) based on having a derivative function that is related to the inputs, and they allow "stacking" of multiple layers to create deep neural networks. As above, multiple hidden layers generally increase a deep neural network's ability to learn complex data sets and generate accurate inferences. Activation functions may also help normalize the output of each node to a range between, for example, [0,1] or [−1, 1].

Returning to the channel fusion example, applying 1×1×d kernels and adding an activation layer after the kernel may give a network added depth, which may increase its performance.

Guided Training of Machine Learning Models by Early Feature Fusion in Convolution Layers Guided training of machine learning models, such as deep neural networks, allows for training such models using multi-domain training data.

For example, consider a scenario in which a training dataset contains images (a primary domain of data) and features regarding those images (a supplementary domain of data). The features in the supplementary domain may be "handcrafted", for example, by subject matter experts that have reviewed the images and made feature determinations about the images based on domain knowledge, or by domain-specific (or even general) algorithms. Because the information within the handcrafted features is complimentary to the images, both the images and the handcrafted features can be used to effectively train a model. Guided training thus allows for combining the multiple domains of training data in an effort to improve resulting model performance.

Figure 3:
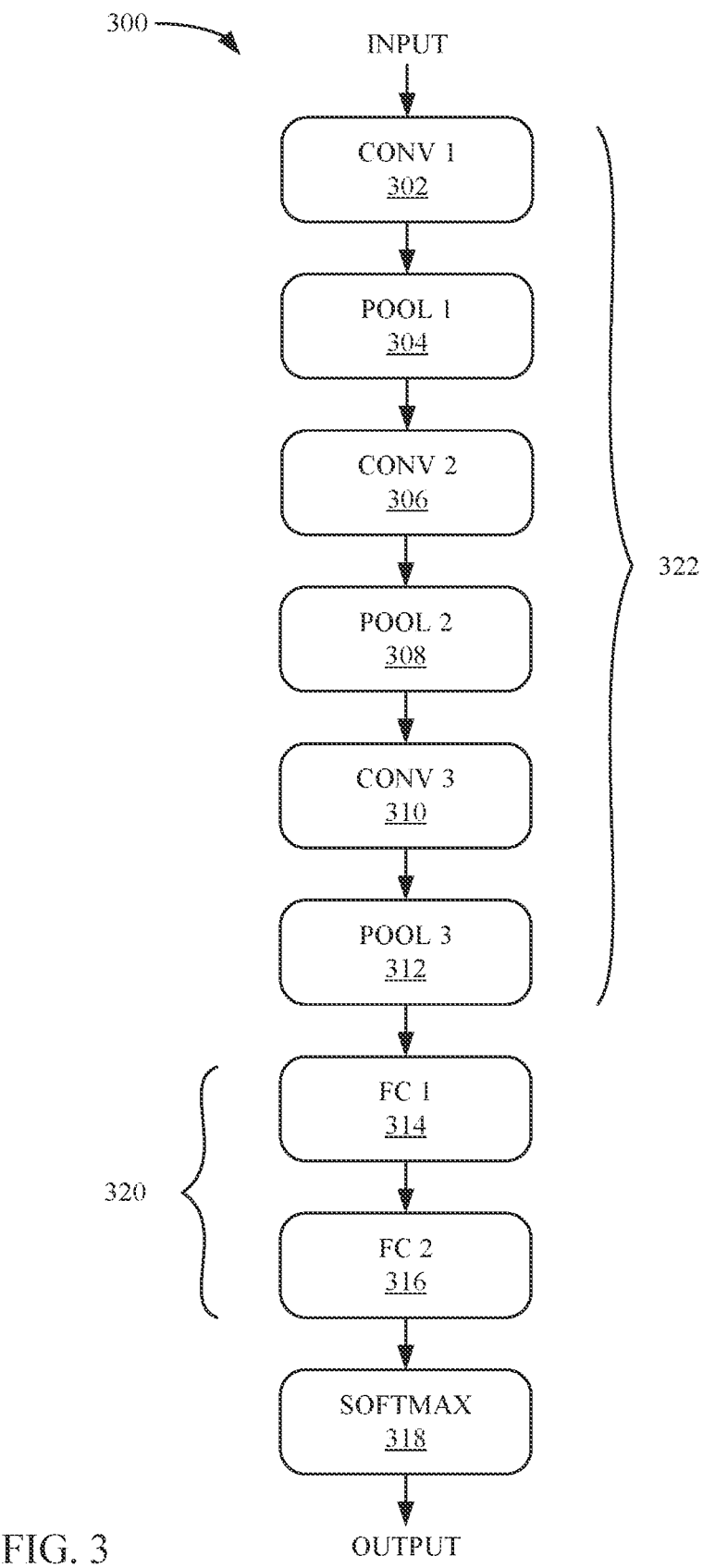
FIG. 3 depicts an example deep neural network architecture.

Conventional guided training concatenates the supplementary domain features (e.g., the handcrafted features) with the fully connected blocks of a deep neural network. For example, FIG. 3 depicts an example deep neural network 300 architecture that includes convolution layers (or blocks) (302, 306, and 310), pooling layers (304, 308, and 312), fully connected layers (314 and 316), and a softmax function 318 for producing output. Thus, conventional guided training would concatenate the supplementary domain features with one of fully connected layers 314 or 316 of deep neural network 300.

In many cases, such as with deep neural network 300, the fully connected layer portion 320 is at the end of the network. In such cases, the supplementary domain features tend to have an overly significant impact on the final output based solely on where they are incorporated into the neural network. For example, during training, the convolution portion of a deep neural network (e.g., portion 322 of deep neural network 300) may get "lazy" and allow for the fully connected layers (concatenated with the supplementary features) to have a disproportionate effect on the final output. Thus, the benefit of training with multiple domains of data may be mitigated or lost entirely.

The methods of guided training of machine learning models described herein, by contrast, fuse supplementary domain features (such as handcrafted features) in one or more convolution layers of a machine learning model, such as deep neural network 300. Because convolution layers tend to precede the fully connected layers in a deep neural network model, the fusing of supplementary features earlier in the deep neural network will beneficially balance the impact of the supplementary features so that they add to the performance of the deep neural network rather than dominating it.

In the guided training methods described herein, the supplementary domain features are fused into a deep neural network through an "attention" mechanism, such as by performing element-wise multiplication with intermediate channels of the deep neural network. Using this approach, the supplementary domain features can be fed repetitively into the convolution layers so that the deep neural network does not get "lazy" and the supplementary domain features can therefore "guide" convolution layers.

Further, the method of guided training described herein fuses supplementary domain features with convolution blocks in such a way that the computational complexity and latency of the machine learning model do not increase. Beneficially, then, additional information is processed by the machine learning model, which improves the performance of the machine learning model, without the downside of added complexity.

Figure 4:
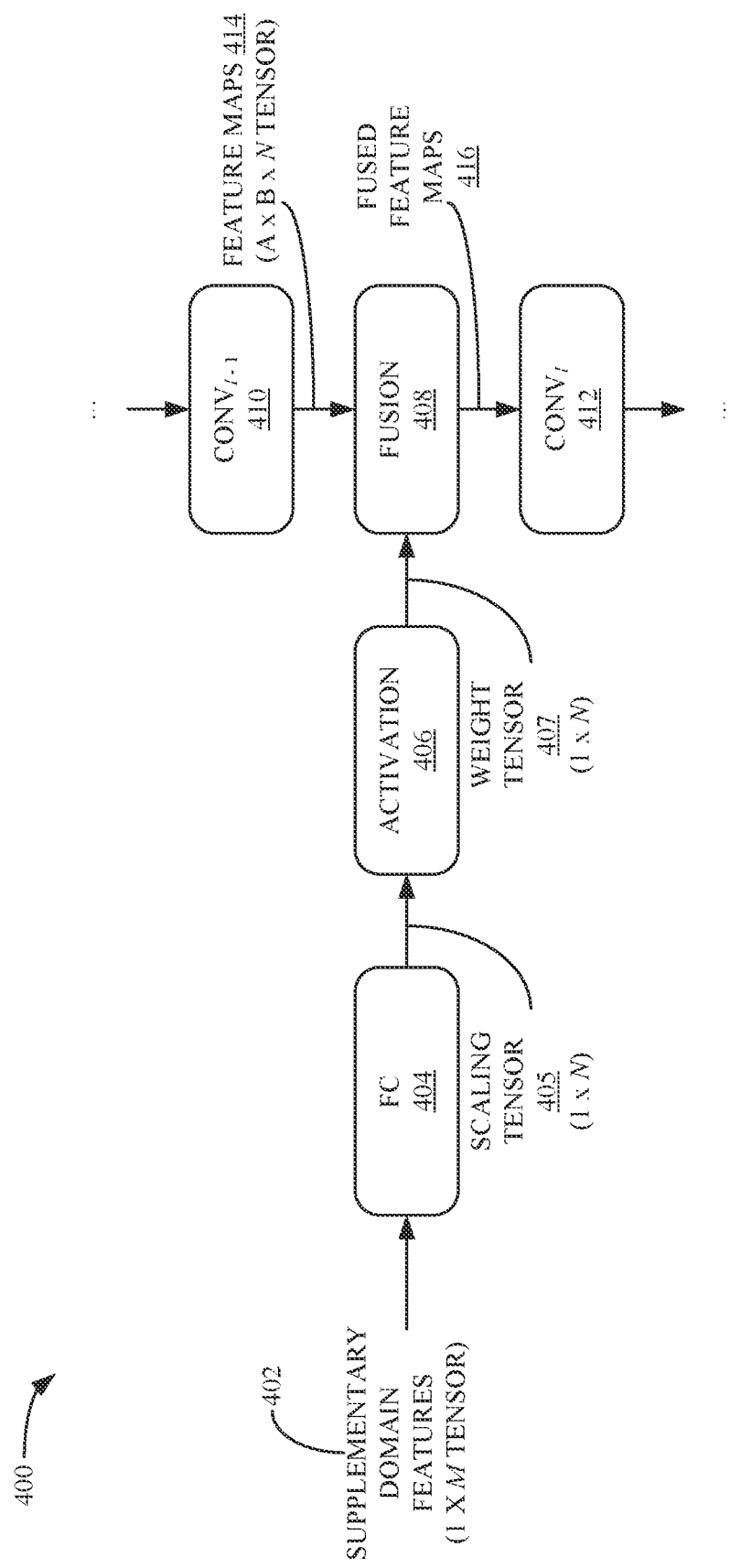
FIG. 4 depicts an example flow for fusing supplementary domain features into an existing machine learning model architecture.

FIG. 4 depicts an example flow 400 for fusing supplementary domain features into an existing machine learning model. In this example, the machine learning model is a deep neural network model, of which only convolutions layers 410 and 412 are depicted for simplicity.

Flow 400 begins with inputting supplementary domain features 402 (arranged in a 1×M tensor) into to a fully connected layer 404 of dimensionality M×N. The output of fully connected layer 404 is scaling tensor 405, which has dimensionality of 1×N. The processing by fully connected layer 404 essentially computes a scaling factor for each of the N channels, and is made in order to match the number of channels in the set of feature maps 414, which is the output from convolution layer 410.

Scaling tensor 405 is then processed by activation function 406. In some examples, activation function 406 is a sigmoid function, while in other examples, other non-linear activation functions can be used. In this case, activation function 406 serves not only to provide additional non-linearity to the network, but also to transform the scaling factors in scaling tensor 405 to scaled weights in weight tensor 407 (e.g., one or more supplementary domain feature maps) so that individual supplementary domain features (e.g., in set 402) do not have a disproportionate impact on the model. In some embodiments, activation function 406 may scale the weights in weight tensor 407 in the range of [0,1] thereby performing a normalization of the activation output.

The output of activation function 406 is weight tensor 407, which also has dimensionality of 1×N. Weight tensor 407 is then used as input to fusion function 408. Fusion function 408 fuses weight tensor 407 with the output of convolution 410, which is a set of feature maps, e.g., a tensor with dimensionality A×B×N. In one example, set of feature maps 414 comprises image data with a height (A), width (B), and number of channels (N).

Because the channel dimensionality of weight tensor 407 matches the channel dimensionality of the set of feature maps 414, the "fusion" may happen by an element-wise combination (e.g., multiplication) of the set of feature maps 414 with weight tensor 407 so that each of the N channels gets weighted by the supplementary domain feature data, which completes the fusion.

The fused feature maps 416 is then used as input to convolution layer 412.

Notably, this method fuses the supplementary domain feature data without increasing the dimensionality, and therefore without raising the computational complexity. Thus, this method beneficially does not increase the latency of network 400. Further, adding a fully connected layer (e.g., 404) to an existing model architecture incurs minimal overhead because M and N are typically relatively small. Further, where an existing network architecture uses "squeeze" and/or "excitation" blocks (e.g., blocks that include channel-specific weighting parameters for a convolutional block so that the network can adaptively adjust the weighting of each feature map), this method can be used to replace such blocks with no overhead.

This method also saves a significant amount of computations as compared to, for example, "blowing up" the supplementary domain features (e.g., handcrafted features) by making the supplementary domain features into a two-dimensional tensor matching the shape of the set of feature map 414 and thereby increasing the resulting channel dimensionality. Creating a multi-dimensional supplementary domain feature tensor may significantly (and detrimentally) increase multiply and accumulate (MAC) process counts.

Notably, while FIG. 4 depicts a single fusion of the supplementary domain features 402 into a single convolution layer's input (412), the same method may be repeated multiple times for a particular convolution layer, as well as multiple times across different convolution layers, in order to guide the convolution layers.

Figure 5:
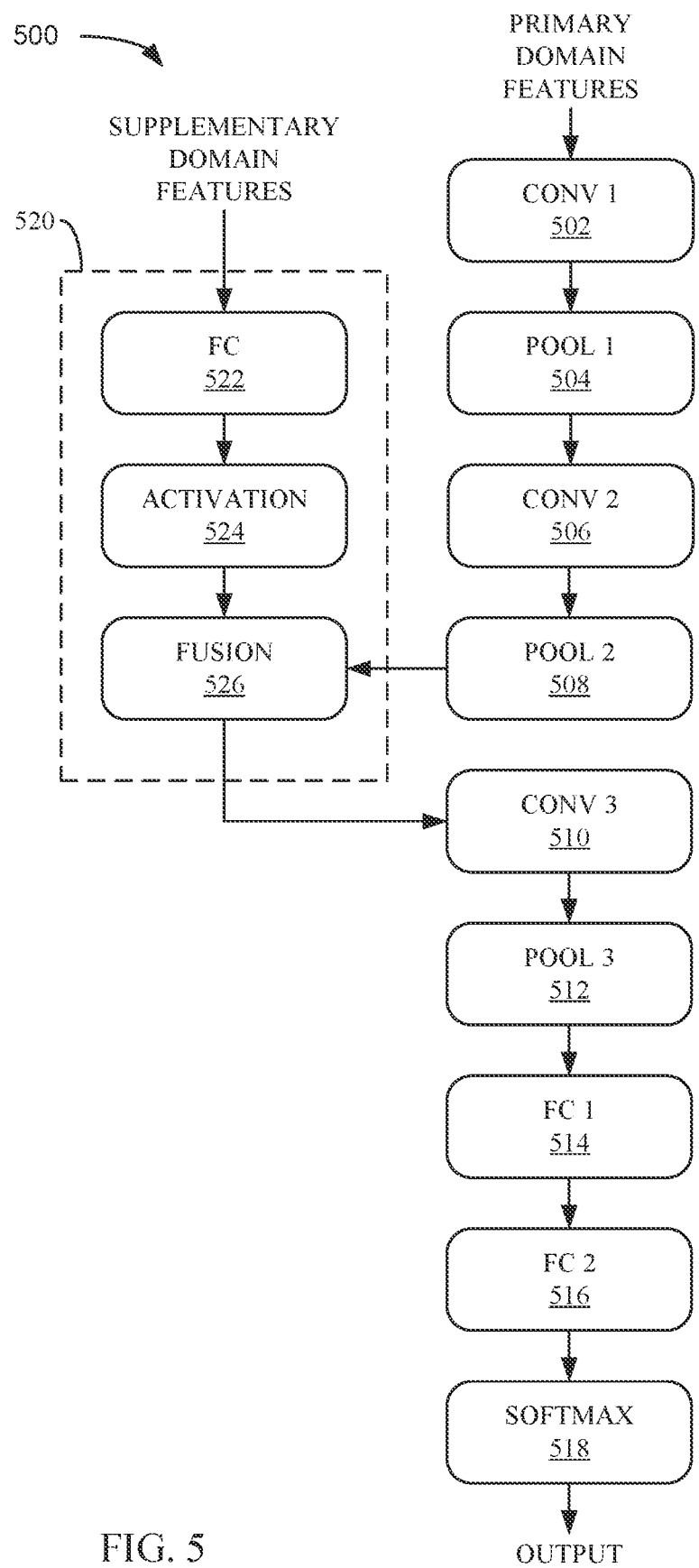
FIG. 5 depicts an example deep neural network architecture with a supplementary domain feature guiding block.

FIG. 5 depicts an example deep neural network 500, which is similar to deep neural network 300 in FIG. 3, but which includes a new supplementary domain feature guiding block 520 in the architecture.

In FIG. 5, supplementary domain features are integrated into the primary domain features being processed by the primary network (502-518) via feature guiding block 520, which includes a fully connected layer 522, activation function 524, and fusion function 526 (similar to the operation of blocks 404, 406, and 408 of FIG. 4). As above, fully connected layer 522 may be used to change dimensionality of the supplementary domain feature tensor to match that of the pooled output of pooling layer 508 in the primary network. Activation function 524 may be used to provide additional non-linearity to the overall network and to transform scaling factors coming out of fully connected layer 522 to scaled weights that may be input to fusion function 526. Finally, fusion function 526 fuses the scaled weights with the pooled output from layer 508 and provides the fused features (or fused domain features) as inputs to convolution layer 510.

Thus, FIG. 5 depicts how an existing architecture, such as in FIG. 3, can be modified and enhanced by adding a guided training block, such as described with respect to FIGS. 4 and 5.

Note that in other examples, multiple guided training blocks may be added wherein the fusion output is provided to different convolution layers.

Example Simulation Results

One potential application for the methods described herein is for a fingerprint anti-spoofing prediction model, i.e., a model configured to output a determination of whether a fingerprint read by a sensor (e.g., on a mobile electronic device such as a smartphone) is a real or spoof fingerprint. Table 1, below, depicts example simulation results using three conventional network designs and an area under the curve (AUC10) performance metric.

TABLE 1

Fingerprint Anti-Spoofing Model Test Results

| Model # | Baseline Accuracy | Concatenated Features | Fused Features |
|---------|-------------------|----------------------|----------------|
| 1 | 66.24% | 73.48% | 76.10% |
| 2 | 64.12% | | 76.85% |
| 3 | 63.48% | | 75.57% |

Table 1 demonstrates that the fused feature method described herein significantly outperformed the baseline models and outperformed the models wherein features were concatenated to deep, fully connected layers (as in portion 320 depicted in FIG. 3) instead of earlier convolution layers (as in portion 322 in FIG. 3).

Example Method for Guided Training of a Machine Learning Model

Figure 6:
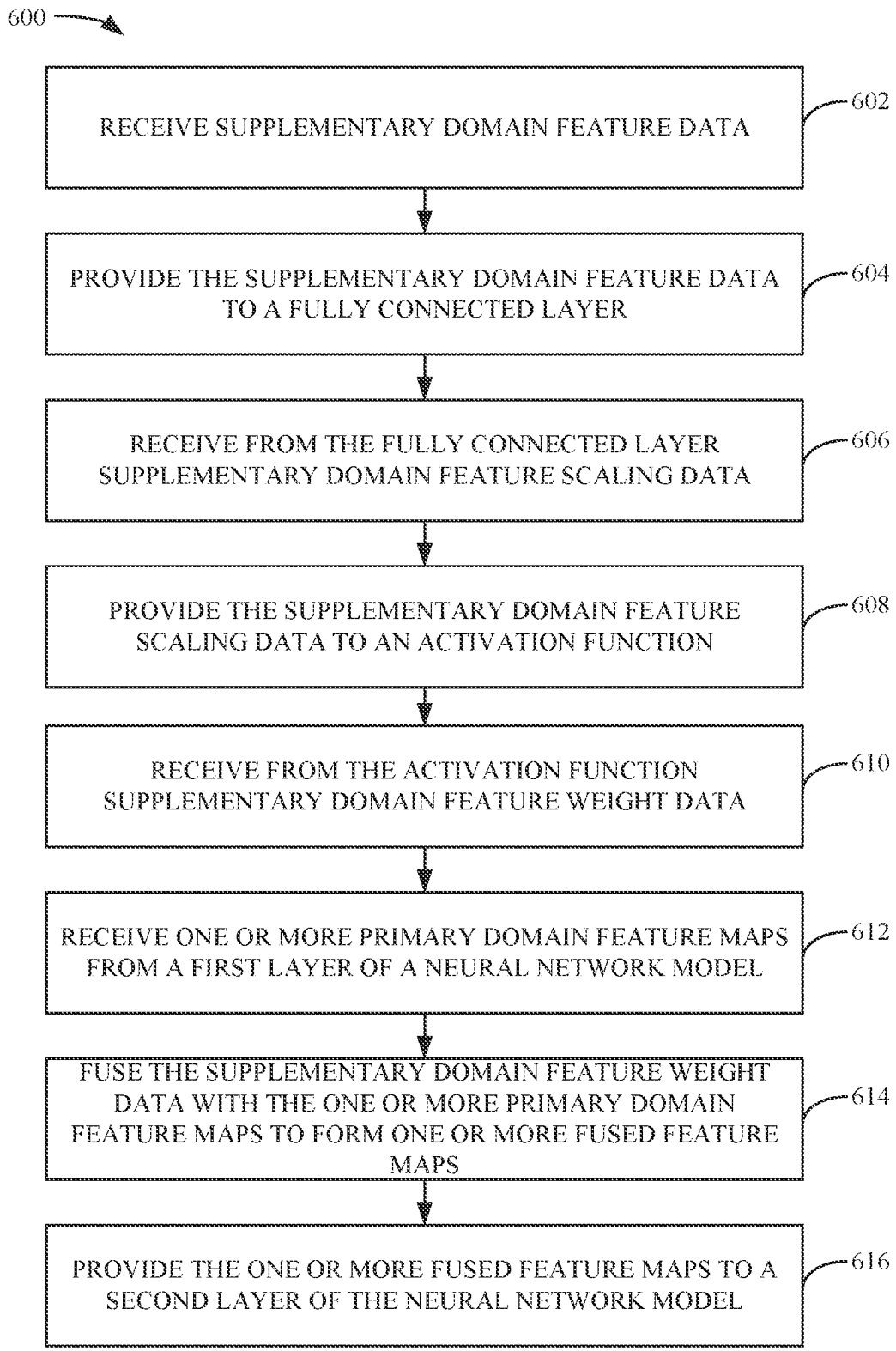
FIG. 6 depicts an example method for performing guided training of a machine learning model.

FIG. 6 depicts an example method 600 of guided training of a machine learning model, such as, for example, described above with respect to FIGS. 4 and 5.

Method 600 begins at step 602 with receiving supplementary domain feature data.

In some embodiments, the supplementary domain feature data comprises a 1×M dimensional tensor.

In some embodiments, the supplementary domain feature data comprises supplementary image features.

In some embodiments, the supplementary domain feature data was generated by a domain expert. In other embodiments, the supplementary domain feature data was generated by a feature extraction algorithm.

Method 600 then proceeds to step 604 with providing the supplementary domain feature data to a fully connected layer, such as depicted in FIGS. 4 and 5. In some embodiments, the fully connected layer comprises an M×N dimensionality.

Method 600 then proceeds to step 606 with receiving from the fully connected layer supplementary domain feature scaling data, such as depicted in FIGS. 4 and 5. In some embodiments, the supplementary domain feature scaling data comprises a 1×N dimensional tensor.

Method 600 then proceeds to step 608 with providing the supplementary domain feature scaling data to an activation function, such as depicted in FIGS. 4 and 5. In some embodiments, the activation function is a non-linear activation function, such as a sigmoid function.

Method 600 then proceeds to step 610 with receiving from the activation function supplementary domain feature weight data (e.g., one or more feature maps), such as depicted in FIGS. 4 and 5. In some embodiments, the supplementary domain feature weight data comprises a 1×N dimensional tensor.

Method 600 then proceeds to step 612 with receiving one or more primary domain feature maps from a first layer of the neural network model. In some embodiments, the first layer is a convolution layer, as in the example of FIG. 4. In some embodiments, the first layer is a pooling layer, as in the example of FIG. 5. In some embodiments, the one or more primary domain feature maps comprises an A×B×N dimensional tensor. In some embodiments, the one or more primary domain feature maps comprises image data.

Method 600 then proceeds to step 614 with fusing the supplementary domain feature weight data (e.g., one or more supplementary domain feature maps) with the one or more primary domain feature maps to form one or more fused feature maps. In some embodiments, fusing the supplementary domain feature weight data with the one or more primary domain feature maps comprises performing an element-wise multiplication between the supplementary domain feature weight data and the one or more primary domain feature maps.

Method 600 then proceeds to step 616 with providing the one or more fused feature maps to a second layer of the neural network model. In some embodiments, the second layer is a convolution layer, as in the example of FIGS. 4 and 5.

Example Processing Systems for Performing Phase Selective Convolution

Figure 7:
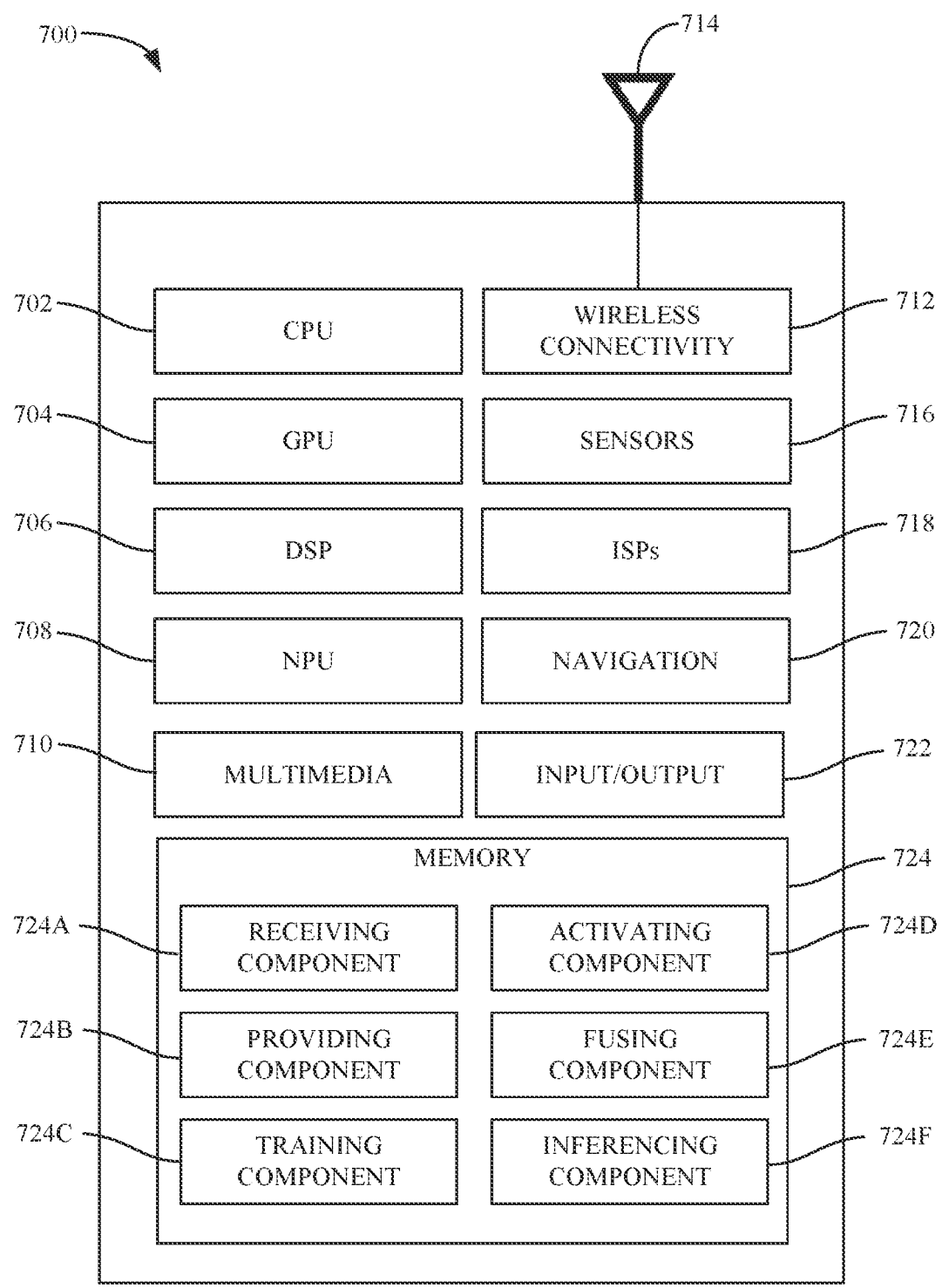
FIG. 7 illustrates an example electronic device, which may be configured to perform the methods described herein.

FIG. 7 illustrates an example electronic device 700. Electronic device 700 may be configured to perform the methods described herein, including with respect to FIG. 6.

Electronic device 700 includes a central processing unit (CPU) 702, which in some embodiments may be a multi-core CPU. Instructions executed at the CPU 702 may be loaded, for example, from a program memory associated with the CPU 702 or may be loaded from a memory block 724.

Electronic device 700 also includes additional processing blocks tailored to specific functions, such as a graphics processing unit (GPU) 704, a digital signal processor (DSP) 706, a neural processing unit (NPU) 708, a multimedia processing block 710, a multimedia processing unit 710, and a wireless connectivity block 712.

In one implementation, NPU 708 is implemented in one or more of CPU 702, GPU 704, and/or DSP 706.

In some embodiments, wireless connectivity block 712 may include components, for example, for third generation (3G) connectivity, fourth generation (4G) connectivity (e.g., 4G LTE), fifth generation connectivity (e.g., 5G or NR), Wi-Fi connectivity, Bluetooth connectivity, and wireless data transmission standards. Wireless connectivity processing block 712 is further connected to one or more antennas 714.

Electronic device 700 may also include one or more sensor processors 716 associated with any manner of sensor, one or more image signal processors (ISPs) 716 associated with any manner of image sensor, and/or a navigation processor 720, which may include satellite-based positioning system components (e.g., GPS or GLONASS) as well as inertial positioning system components.

Electronic device 700 may also include one or more input and/or output devices 722, such as screens, touch-sensitive surfaces (including touch-sensitive displays), physical buttons, speakers, microphones, and the like.

In some embodiments, one or more of the processors of electronic device 700 may be based on an ARM instruction set.

Electronic device 700 also includes memory 724, which is representative of one or more static and/or dynamic memories, such as a dynamic random access memory, a flash-based static memory, and the like. In this example, memory 724 includes computer-executable components, which may be executed by one or more of the aforementioned processors of electronic device 700. In particular, in this embodiment, memory 724 includes receiving component 724A, providing component 724B, training component 724C, activating component 724D, fusing component 724E, and inferencing component 724F.

Notably, in other embodiments, aspects of electronic device 700 may be omitted, such as where electronic device 700 is a server. For example, multimedia component 710, wireless connectivity 712, sensors 716, ISPs 718, and/or navigation component 720 may be omitted in other embodiments.

Generally, electronic device 700 and/or components thereof may be configured to perform the methods described herein.

Figure 8:
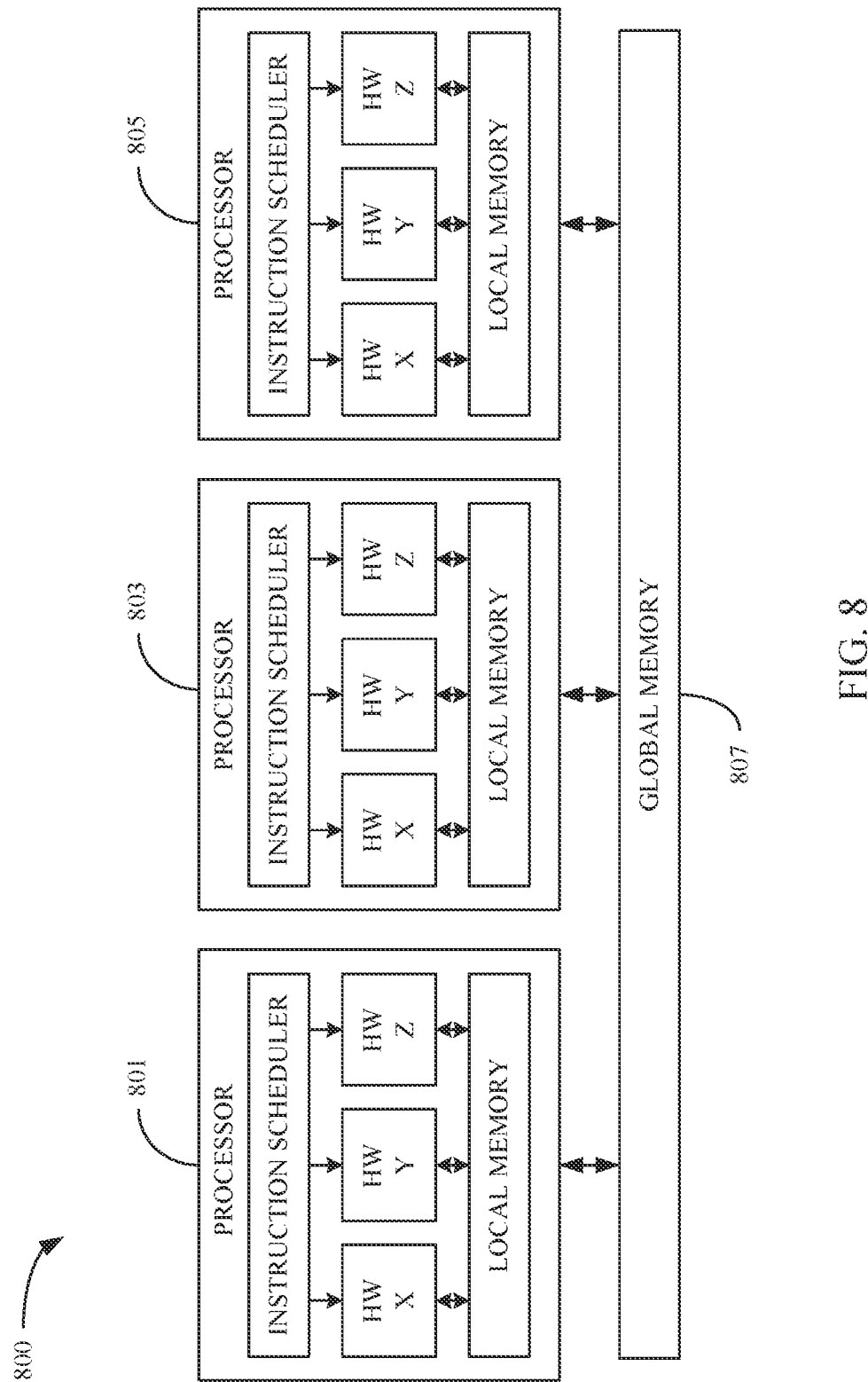
FIG. 8 depicts an example multi-processor processing system, which may be configured to perform the methods described herein.

FIG. 8 depicts an example multi-processor processing system 800 that may be implemented with embodiments described herein. For example, multi-processing system 800 may be representative of various processors of electronic device 700 of FIG. 7.

In this example, system 800 includes processors 801, 803, and 805, but in other examples, any number of individual processors may be used. Further, though depicted similarly, processors 801, 803, and 805 may be representative of various different kinds of processors in an electronic device, such as CPUs, GPUs, DSPs, NPUs, and the like as described herein.

Each of processors 801, 803, and 805 includes an instruction scheduler, various hardware sub-components (e.g., hardware X, hardware Y, and hardware Z), and a local memory. In some embodiments, the local memory may be a tightly coupled memory (TCM). Note that while the components of each of processors 801, 803, and 805 are shown as the same in this example, in other examples, some or each of the processors 801, 803, and 805 may have different hardware configurations, different hardware elements, etc.

Each of processors 801, 803, and 805 is also in data communication with a global memory, such as a DDR memory, or other types of volatile working memory. For example, global memory 807 may be representative of memory 724 of FIG. 7.

In some implementations, in a multi-processor processing system such as 800, one of the processors may act as a master processor. For example, processor 801 may be a master processor in this example. A master processor may include a compiler that, when executed, can determine how a model, such as a neural network, will be processed by various components of processing system 800. For example, hardware parallelism may be implemented by mapping portions of the processing of a model to various hardware (e.g., hardware X, hardware Y, and hardware Z) within a given processor (e.g., processor 801) as well as mapping portions of the processing of the model to other processors (e.g., processors 803 and 805) and their associated hardware. For example, the parallel blocks in the parallel block processing architectures described herein may be mapped to different portions of the various hardware in processors 801, 803, and 805.

EXAMPLE CLAUSES

Clause 1: A method, comprising: receiving a primary domain feature map from a first layer of a neural network model; receiving supplementary domain feature data; generating a supplementary domain feature map based on the supplementary domain feature data; fusing the supplementary domain feature map with the primary domain feature map to generate a fused feature map; and providing the fused feature map to a second layer of the neural network model.

Clause 2: The method of Clause 1, wherein generating the supplementary domain feature map based on the supplementary domain feature data comprises: providing the supplementary domain feature data to a fully connected layer; receiving from the fully connected layer supplementary domain feature scaling data; providing the supplementary domain feature scaling data to an activation function; and receiving from the activation function the supplementary domain feature map.

Clause 3: The method of Clause 2, wherein the activation function is a non-linear activation function.

Clause 4: The method of Clause 3, wherein the non-linear activation function is a sigmoid function.

Clause 5: The method of any one of Clauses 1-4, wherein fusing the supplementary domain feature map with the primary domain feature map comprises performing an element-wise multiplication between the supplementary domain feature map and the primary domain feature map.

Clause 6: The method of any one of Clauses 1-5, wherein: the first layer comprises a first convolution layer, and the second layer comprises a second convolution layer.

Clause 7: The method of any one of Clauses 1-6, wherein: the first layer comprises a pooling layer, and the second layer comprises a convolution layer.

Clause 8: The method of any one of Clauses 2-4, wherein the fully connected layer is configured to scale the supplementary domain feature data from a first dimensionality to a second dimensionality.

Clause 9: The method of any one of Clauses 1-8, wherein: the supplementary domain feature data comprises supplementary image features, and the primary domain feature map comprises image data.

Clause 10: The method of any one of Clauses 1-9, further comprising training the neural network model based at least in part on the fused feature map.

Clause 11: A processing system, comprising: a memory comprising computer-executable instructions; and one or more processors configured to execute the computer-executable instructions and cause the processing system to perform a method in accordance with any one of Clauses 1-10.

Clause 12: A non-transitory computer-readable medium comprising computer-executable instructions that, when executed by one or more processors of a processing system, cause the processing system to perform a method in accordance with any one of Clauses 1-10.

Clause 13: A computer program product embodied on a computer-readable storage medium comprising code for performing a method in accordance with any one of Clauses 1-10.

Clause 14: A processing system comprising means for performing a method in accordance with any one of Clauses 1-10.

ADDITIONAL CONSIDERATIONS

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method, comprising:
   receiving a primary domain feature map from a first layer of a neural network model;
   receiving supplementary domain feature data;
   generating a supplementary domain feature map based on scaled supplementary domain feature data, wherein the supplementary domain feature map is normalized based on supplementary domain feature scaling data, and a fully connected layer of the neural network model is configured to scale the supplementary domain feature data from a first dimensionality to a second dimensionality associated with an output of a pooling layer of the neural network model;

fusing the supplementary domain feature map with the primary domain feature map to generate a fused feature map; and providing the fused feature map to a second layer of the neural network model.

2. The method of claim 1, wherein generating the supplementary domain feature map based on the scaled supplementary domain feature data comprises:

providing the supplementary domain feature data to the fully connected layer;

receiving from the fully connected layer the supplementary domain feature scaling data;

providing the supplementary domain feature scaling data to an activation function for scaling weights associated with individual supplementary domain features; and receiving from the activation function the supplementary domain feature map normalized based on the scaled weights.

3. The method of claim 2, wherein the activation function is a non-linear activation function.

4. The method of claim 3, wherein the non-linear activation function is a sigmoid function.

5. The method of claim 1, wherein fusing the supplementary domain feature map with the primary domain feature map comprises performing an element-wise multiplication between the supplementary domain feature map and the primary domain feature map.

6. The method of claim 1, wherein:
the first layer comprises a first convolution layer, and
the second layer comprises a second convolution layer.

7. The method of claim 1, wherein:
the first layer comprises a pooling layer, and
the second layer comprises a convolution layer.

8. The method of claim 1, wherein:
the supplementary domain feature data comprises supplementary image features, and
the primary domain feature map comprises image data.

9. The method of claim 1, further comprising training the neural network model based at least in part on the fused feature map.

10. A processing system configured to performing guided training of a neural network model, comprising:
at least one memory comprising computer-executable instructions; and
one or more processors configured to execute the computer-executable instructions and cause the processing system to:
receive a primary domain feature map from a first layer of a neural network model;
receive supplementary domain feature data;
generate a supplementary domain feature map based on scaled supplementary domain feature data, wherein the supplementary domain feature map is normalized based on supplementary domain feature scaling data, and a fully connected layer of the neural network model is configured to scale the supplementary domain feature data from a first dimensionality to a second dimensionality associated with an output of a pooling layer of the neural network model;
fuse the supplementary domain feature map with the primary domain feature map to generate a fused feature map; and
provide the fused feature map to a second layer of the neural network model.

11. The processing system of claim 10, wherein in order to generate the supplementary domain feature map based on the scaled supplementary domain feature data, the one or more processors are further configured to cause the processing system to:
provide the supplementary domain feature data to the fully connected layer;
receive from the fully connected layer the supplementary domain feature scaling data;
provide the supplementary domain feature scaling data to an activation function for scaling weights associated with individual supplementary domain features; and
receive from the activation function the supplementary domain feature map normalized based on the scaled weights.

12. The processing system of claim 11, wherein the activation function is a non-linear activation function.

13. The processing system of claim 12, wherein the non-linear activation function is a sigmoid function.

14. The processing system of claim 10, wherein in order to fuse the supplementary domain feature map with the primary domain feature map, the one or more processors are further configured to cause the processing system to perform an element-wise multiplication between the supplementary domain feature map and the primary domain feature map.

15. The processing system of claim 10, wherein:
the first layer comprises a first convolution layer, and
the second layer comprises a second convolution layer.

16. The processing system of claim 10, wherein:
the first layer comprises a pooling layer, and
the second layer comprises a convolution layer.

17. The processing system of claim 10, wherein:
the supplementary domain feature data comprises supplementary image features, and
the primary domain feature map comprises image data.

18. The processing system of claim 10, wherein the one or more processors are further configured to cause the processing system to train the neural network model based at least in part on the fused feature map.

19. A non-transitory computer-readable medium comprising instructions that, when executed by one or more processors of a processing system, cause the processing system to perform a method, the method comprising:
receiving a primary domain feature map from a first layer of a neural network model;
receiving supplementary domain feature data;
generating a supplementary domain feature map based on scaled supplementary domain feature data, wherein the supplementary domain feature map is normalized based on supplementary domain feature scaling data, and a fully connected layer of the neural network model is configured to scale the supplementary domain feature data from a first dimensionality to a second dimensionality associated with an output of a pooling layer of the neural network model;
fusing the supplementary domain feature map with the primary domain feature map to generate a fused feature map; and
providing the fused feature map to a second layer of the neural network model.

20. The non-transitory computer-readable medium of claim 19, wherein generating the supplementary domain feature map based on the scaled supplementary domain feature data comprises:
providing the supplementary domain feature data to the fully connected layer;

receiving from the fully connected layer the supplementary domain feature scaling data;

providing the supplementary domain feature scaling data to an activation function for scaling weights associated with individual supplementary domain features; and receiving from the activation function the supplementary domain feature map normalized based on the scaled weights.

21. The non-transitory computer-readable medium of claim 20, wherein the activation function is a sigmoid function.

22. The non-transitory computer-readable medium of claim 19, wherein fusing the supplementary domain feature map with the primary domain feature map comprises performing an element-wise multiplication between the supplementary domain feature map and the primary domain feature map.

23. The non-transitory computer-readable medium of claim 19, wherein:
the first layer comprises a first convolution layer, and
the second layer comprises a second convolution layer.

24. The non-transitory computer-readable medium of claim 19, wherein:
the first layer comprises a pooling layer, and
the second layer comprises a convolution layer.

25. The non-transitory computer-readable medium of claim 19, wherein:
the supplementary domain feature data comprises supplementary image features, and
the primary domain feature map comprises image data.

26. The non-transitory computer-readable medium of claim 19, wherein the method further comprises training the neural network model based at least in part on the fused feature map.

* * * * *